(12) United States Patent
Eckhoff et al.

(10) Patent No.: US 6,783,563 B1
(45) Date of Patent: Aug. 31, 2004

(54) DOWNDRAFT DUST COLLECTOR

(75) Inventors: Paul J. Eckhoff, Jackson, TN (US); Leslie Daily Gist, Jackson, TN (US); Angela Denise Shelton, Jackson, TN (US)

(73) Assignee: Delta International Machinery Corp., Jackson, TN (US)

( * ) Notice: Subject to any disclaimer, the term of this patent is extended or adjusted under 35 U.S.C. 154(b) by 0 days.

(21) Appl. No.: 10/256,921

(22) Filed: Sep. 27, 2002

Related U.S. Application Data

(63) Continuation-in-part of application No. 10/254,811, filed on Sep. 25, 2002.

(51) Int. Cl.[7] ............................ B01D 29/11; B01D 46/02
(52) U.S. Cl. ............................ 55/356; 55/378; 55/385.1; 55/429; 55/467; 55/DIG. 18
(58) Field of Search ....................... 55/323, 341.1, 55/341.5, 356, 361, 378, 385.1, 428, 429, 467, DIG. 18, DIG. 29

(56) References Cited

U.S. PATENT DOCUMENTS

| | | | | |
|---|---|---|---|---|
| 1,267,091 A | * | 5/1918 | Leiman et al. ............... 96/329 |
| 1,776,777 A | * | 9/1930 | Bragstad ..................... 55/314 |
| 2,341,628 A | * | 2/1944 | Koweindl .................... 454/49 |
| 3,120,432 A | * | 2/1964 | Aldrich ....................... 55/315 |
| 3,387,433 A | * | 6/1968 | Mackey ....................... 55/356 |
| 3,391,689 A | * | 7/1968 | Roger ...................... 126/299 R |
| 3,653,190 A | * | 4/1972 | Lee et al. .................... 55/302 |
| 3,686,836 A | * | 8/1972 | Rabilloud et al. ............ 55/467 |
| 3,880,061 A | * | 4/1975 | Hensiek et al. ............... 454/66 |
| 4,092,136 A | * | 5/1978 | Zimbardi ..................... 96/399 |
| 4,201,256 A | * | 5/1980 | Truhan .................... 144/252.2 |
| 4,227,902 A | * | 10/1980 | Olson ......................... 55/302 |
| 4,248,162 A | * | 2/1981 | Skeist ..................... 108/50.13 |
| 4,268,282 A | * | 5/1981 | MacKenzie .................... 96/58 |
| 4,375,712 A | * | 3/1983 | Kato et al. .................. 16/282 |
| 4,531,956 A | * | 7/1985 | Howorth ..................... 96/223 |
| 4,624,690 A | * | 11/1986 | Byrnes ..................... 55/385.1 |
| 4,647,295 A | * | 3/1987 | Christ ........................ 95/284 |
| 4,715,872 A | * | 12/1987 | Snyder ....................... 55/315 |
| 4,917,712 A | * | 4/1990 | Crigler ....................... 95/280 |
| 5,083,558 A | * | 1/1992 | Thomas et al. .......... 128/202.12 |
| 5,131,192 A | * | 7/1992 | Cheng ....................... 451/456 |
| 5,139,546 A | * | 8/1992 | Novobilski ................... 96/142 |
| 5,160,517 A | * | 11/1992 | Hicks et al. ............... 55/385.1 |
| 5,163,985 A | * | 11/1992 | Chen .......................... 55/356 |
| 5,230,720 A | * | 7/1993 | Kendall ........................ 96/19 |
| 5,230,723 A | * | 7/1993 | Travis et al. .................. 96/57 |
| 5,240,478 A | * | 8/1993 | Messina ...................... 95/273 |
| 5,441,279 A | * | 8/1995 | Messina ..................... 273/309 |
| 5,511,764 A | * | 4/1996 | Wonsetler .................... 266/49 |
| 5,558,112 A | * | 9/1996 | Strieter .................... 134/103.2 |
| 5,593,470 A | * | 1/1997 | Shagott et al. ............... 96/418 |
| 5,688,297 A | * | 11/1997 | Spengler ..................... 55/356 |
| 5,853,441 A | * | 12/1998 | Groen et al. .............. 55/350.1 |
| 5,904,755 A | * | 5/1999 | Kanazashi et al. ............. 96/55 |
| 5,984,990 A | * | 11/1999 | McDonald ................. 55/385.1 |
| 6,036,736 A | * | 3/2000 | Wallace et al. ............ 55/385.2 |
| 6,221,135 B1 | * | 4/2001 | Wirth, et al. ................. 95/273 |
| 6,383,242 B1 | * | 5/2002 | Rogers et al. ............. 55/385.2 |
| 6,432,173 B1 | * | 8/2002 | Johnson et al. .............. 95/269 |
| 6,444,002 B1 | * | 9/2002 | Mai ......................... 55/385.1 |
| 6,507,974 B1 | * | 1/2003 | Cheng ........................ 15/347 |
| 6,623,538 B2 | * | 9/2003 | Thakur et al. ............. 55/385.2 |
| 2003/0140795 A1 | * | 7/2003 | Rerucha ..................... 96/233 |

* cited by examiner

*Primary Examiner*—Robert H. Spitzer
(74) *Attorney, Agent, or Firm*—Suiter West PC LLO

(57) ABSTRACT

A downdraft dust collector includes a work table disposed with two outfeed support mechanisms, a dust collection system and a platform upon which a support apparatus and the dust collection system are disposed. The platform is disposed with locking base casters. The support apparatus connects to the work table and the platform providing a vertical adjustment system to the work table. A storage cabinet is disposed on the platform and houses the dust collection system.

50 Claims, 7 Drawing Sheets

DOWNDRAFT DUST COLLECTOR

CROSS REFERENCE TO RELATED APPLICATION

The present application is claims priority as a continuation-in-part under 35 U.S.C. §120 to the U.S. patent application Ser. No. 10/254,811, filed on Sep. 25, 2002. The U.S. patent application Ser. No. 10/254,811, is herein incorporated by reference in its entirety.

FIELD OF THE INVENTION

The present invention generally relates to the field of air filtration, and particularly to a downdraft dust collector capable of collecting dust, debris and other loose materials and capable of providing an adjustable work surface and storage areas.

BACKGROUND OF THE INVENTION

Woodworking shops deal with dust and other loose airborne materials on a daily basis. The cutting, sanding and shaping of wood products produce airborne particles that may cause harm to an operator who is unaware of the risk or not properly protected. These same risks exist for the craftsman at home working in their workshop.

Woodworking craftsmen have utilized downdraft dust collectors to minimize the amount of harmful airborne particles in the work environment, as well as providing a secondary work surface upon which larger work pieces may be placed and more easily manipulated. These devices work well for standard size and shape work pieces that may be brought to the downdraft dust collector to be worked on. However, larger and odd-shaped work pieces may require the use of fixed location woodworking machines that cannot be maneuvered to accommodate the downdraft dust collector and further require an additional amount of work piece outfeed support generally not provided by standard downdraft dust collectors. Further, it may be the case that the height of the downdraft dust collector work surface does not match the height of a machine that is manipulating the work piece.

Additionally, woodworkers employ a wide variety of tools and other accessories. For example, they may utilize hand saws, chisels, belt sanders and the like to accomplish a single task. Typically, downdraft dust collectors do not provide any ability to store other tools and accessories. It may be imperative that the woodworker have all these tools readily available no matter where work is being performed.

Therefore, it would be desirable to provide a downdraft dust collector that includes a downdraft table and outfeed supports, is mobile, adjustable to accommodate height requirements of other machines and size requirements of various work pieces as well as providing additional storage capabilities for tools, clothing and the like.

SUMMARY OF THE INVENTION

Accordingly, the present invention is directed to a downdraft dust collector that combines a dust collection system with a downdraft table and multi-position outfeed supports. Further, the downdraft dust collector is mobile, adjustable to accommodate height requirements of other machines and size requirements of various work pieces and provides additional storage capabilities for tools, clothing and the like.

In a first aspect of the present invention the downdraft dust collector collects dust using a dust collection system mounted on a platform. The downdraft dust collector includes a work table and one or more support members connected to the platform and the work table. The downdraft dust collector further includes one or more outfeed support mechanisms connected to the work table for providing extended support to work pieces.

In a second aspect of the present invention the downdraft dust collector includes a dust collection system mounted on a platform. A downdraft table, disposed with a plurality of through points, is connected to the dust collection system and allows dust and debris to be caught. The downdraft dust collector further includes one or more support members connected to the platform and the downdraft table as well as one or more multi-position position outfeed support mechanisms connected to the downdraft table for providing adjustable extended support to a work piece.

In a third aspect of the present invention the downdraft dust collector includes a storage cabinet for additional storage of work accessories and supplies. The dust collection system is disposed within this storage cabinet and connects with a downdraft table for providing dust and debris collection. Multi-position outfeed support mechanisms are connected to the downdraft table. The storage cabinet is mounted on the platform.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
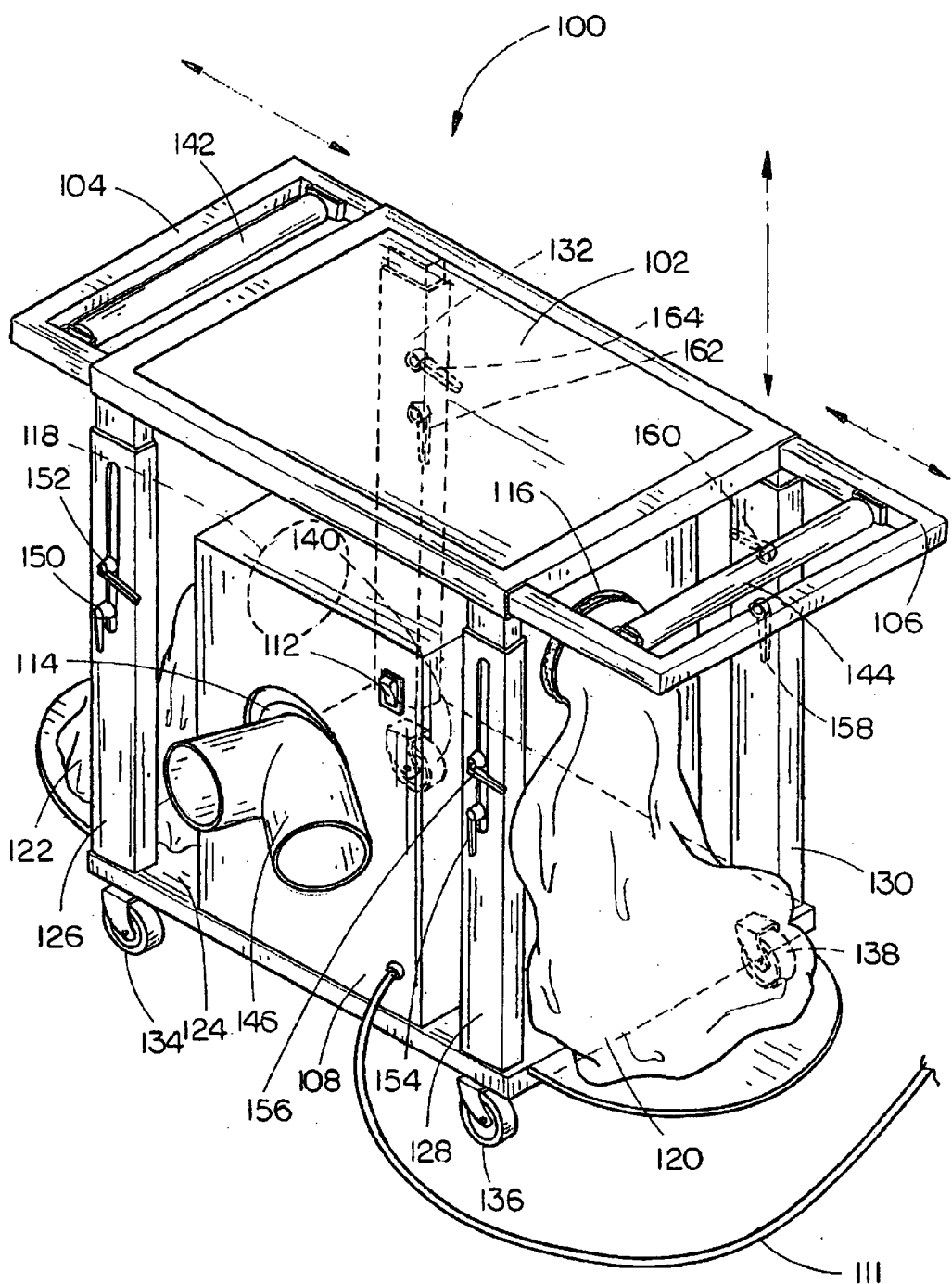
FIG. 1 is an isometric view illustrating a downdraft dust collector in accordance with an exemplary embodiment of the present invention.

Referring generally now to FIG. 1 a downdraft dust collector, generally designated by reference numeral 100, is shown, including a work table 102, a first outfeed support 104, a second outfeed support 106 and a support apparatus comprised of support members 126, 128, 130 and 132.

The downdraft dust collector 100 also includes a dust collection system, which is comprised of a motor disposed within a housing 108 and a power cord 111 connected to the motor through the housing 108. An on/off switch 112 is disposed on the housing 108. The dust collection system further includes an intake dust collection port 114, disposed upon the housing 108 and connected to the motor. Additionally, the dust collection system includes a first outlet gate 116 and a second outlet gate 118. The first outlet gate 116 is disposed upon the housing 108 and connects a first storage facility 120. The second outlet gate 118 is disposed upon the housing 108 and connects a second storage facility 122.

In alternate embodiments the housing may include shelves and drawers in any number and configuration. Further, the housing may be a tool cabinet adapted for connection with the work table 102 including the outfeed support mechanisms. The tool cabinet may provide a vacuum system or portals for connecting with a vacuum system. Other housing configurations as contemplated by one of ordinary skill in the art may be employed without departing from the scope and spirit of the present invention.

Preferably, the downdraft dust collector 100 includes a platform 124, upon which the housing 108, the support members 126 through 132, the first storage facility 120 and the second storage facility 122 are disposed. The platform 124 is also disposed with mobile base members 134, 136, 138 and 140. Alternately, the downdraft dust collector 100 may not include a platform. The connection of the housing 108, the support members 126 through 132, the first storage facility 120 and the second storage facility 122 may be accomplished in a manner contemplated by one of ordinary skill in the art. Further, the number and location of the mobile base members 134 through 140 may vary as contemplated by one of ordinary skill in the art.

The work table 102 provides a flat work surface upon which work pieces can be placed and/or slid across. The table is composed of metal and wood. Rigid metals such as steel, aluminum and the like are preferable. Alternately, the table may be composed of very rigid plastic. The flat surface may be a non-slip surface and the shape and composition of the table may vary to accommodate specific needs or as contemplated by one of ordinary skill in the art.

In an alternate embodiment the work table 102, including the first and second outfeed support mechanisms, may be removable from the downdraft dust collector 100. The removable work table 102 may be connected to a variety of other assemblies such as, a work bench, a cart, a tool cabinet, and the like. Additionally, the removable work table 102 may be attached with a variety of vacuum systems. The removable work table 102 may be connected to support members which enable the removable work table 102 as a stand alone system.

The motor provides vacuuming power to the dust intake collection port 114 and then blowing power to blow the dust collected through the outlet gates 116 and 118 into the storage facilities 120 and 122. In the present embodiment this is a one stage process where the dust is brought in and then immediately sent out into storage. It is contemplated that the dust collection process may be a two stage process. In such an instance the dust is sucked in through the dust intake collection port and then temporarily stored in a dust can attached to the dust intake collection port. Then from the dust can, the dust is sucked out and directed to the outlet gates and storage facilities. An impeller fan or similar device may be employed for pulling the dust out of the dust can and into the storage facilities.

The first and second storage facilities 120 and 122 are standard dust bags. These collection facilities may be dust cans or other such complimentary facilities as may be contemplated by one of ordinary skill in the art. The dust bags rest upon the platform 124. The dust bags connect to the first and second outlet gates 116 and 118. The dust bags may also connect to the support members 126 and 128 through the use of strap fasteners. Other fastening systems, such as screws, bolts, compression joints or the like may be employed. It is contemplated that the first and second storage facilities 120 and 122 would not be affixed to any of the support members 126 through 132. If the storage facilities are dust cans they may be permanently affixed or removable from platform 124.

The support members 126, 128, 130 and 132 are metal posts, which provide structural integrity to the downdraft dust collector 100. Preferably, the support members 126 through 132 connect to the platform 124 at one end and to the underside of the work table 102 at the opposite end. The support members 126 through 132 may be permanently affixed or removable from either or both of the platform 124 and the underside of the work table 102. The number, location, size and material composition of the support members may vary as contemplated by one of ordinary skill in the art.

In the present embodiment the support members 126 through 132 provide vertical adjustment capability. In this embodiment each support member includes two parts, an outer sleeve and an inner arm. The inner arm is connected to the work table 102 and the outer sleeve connects to the platform. Each support member includes two sliding bolt fastener system operable by handles 150, 152, 154, 156, 158, 160, 162 and 164. Utilizing the sliding bolt fastener systems the inner arms can be raised or lowered relative to the outer sleeves and then fixed in a desired position. Other vertical adjustment systems may be employed, such as a hydraulic system and the like, without departing from the scope and spirit of the present invention.

Preferably, the platform 124 is disposed with the mobile base members 134 through 140, which are locking base casters. Alternately, the platform 124 may be operably engaged with a universal base or other base members, mobile or non-mobile, as may be contemplated by one of ordinary skill in the art. Further, it is contemplated that the number of base members may vary. The mobile base members 134 through 140 may be a variety of mechanisms, which allow an operator to move and temporarily affix the downdraft dust collector 100 in one location. The number and size of the mobile base members 134 through 140 may vary as contemplated by one of ordinary skill in the art. The mobile base members 134 through 140 are composed of very rigid plastic, however, they may also be composed of a variety of other rigid materials such as metal, molded rubber and the like.

Preferably, the outfeed support mechanisms 104 and 106 are multi-position outfeed support mechanisms, retractable along the sides of the work table 102. This enables an operator to extend the multi-position outfeed support mechanisms 104 and 106 out to a desired length, when needed to provide extended support to a work piece received on the work table 102, and then retract them in against the work table 102 for storage. The multi-position outfeed support mechanisms may also be vertically adjustable relative to the position of the work table 102. The number and location of the outfeed support mechanisms may vary as contemplated by one of ordinary skill in the art.

The outfeed support mechanisms 104 and 106 include rollers 142 and 144, respectively. Preferably, the rollers 142 and 144 comprise metal cylinders that spin about an axle connected with the two arms of each of the outfeed support mechanisms. However, the size, material composition and connection of the rollers 142 and 144 to the support arms, may vary as contemplated by one of ordinary skill in the art. It is understood that rollers 142 and 144 may include a variety of configurations such as, pads, wheels, belt systems, and the like.

The intake dust collection port 114 is disposed with a dual ported adapter 146. Adapter 146 provides two circular connection ports to which may be affixed intake members such as vacuum hoses and the like. Adapter 146 feeds into the single intake dust collection port 114, however, it is contemplated that intake dust collection port 114 may include two or more ports to separately accommodate each port of the dual ported adapter 146.

Figure 2A:
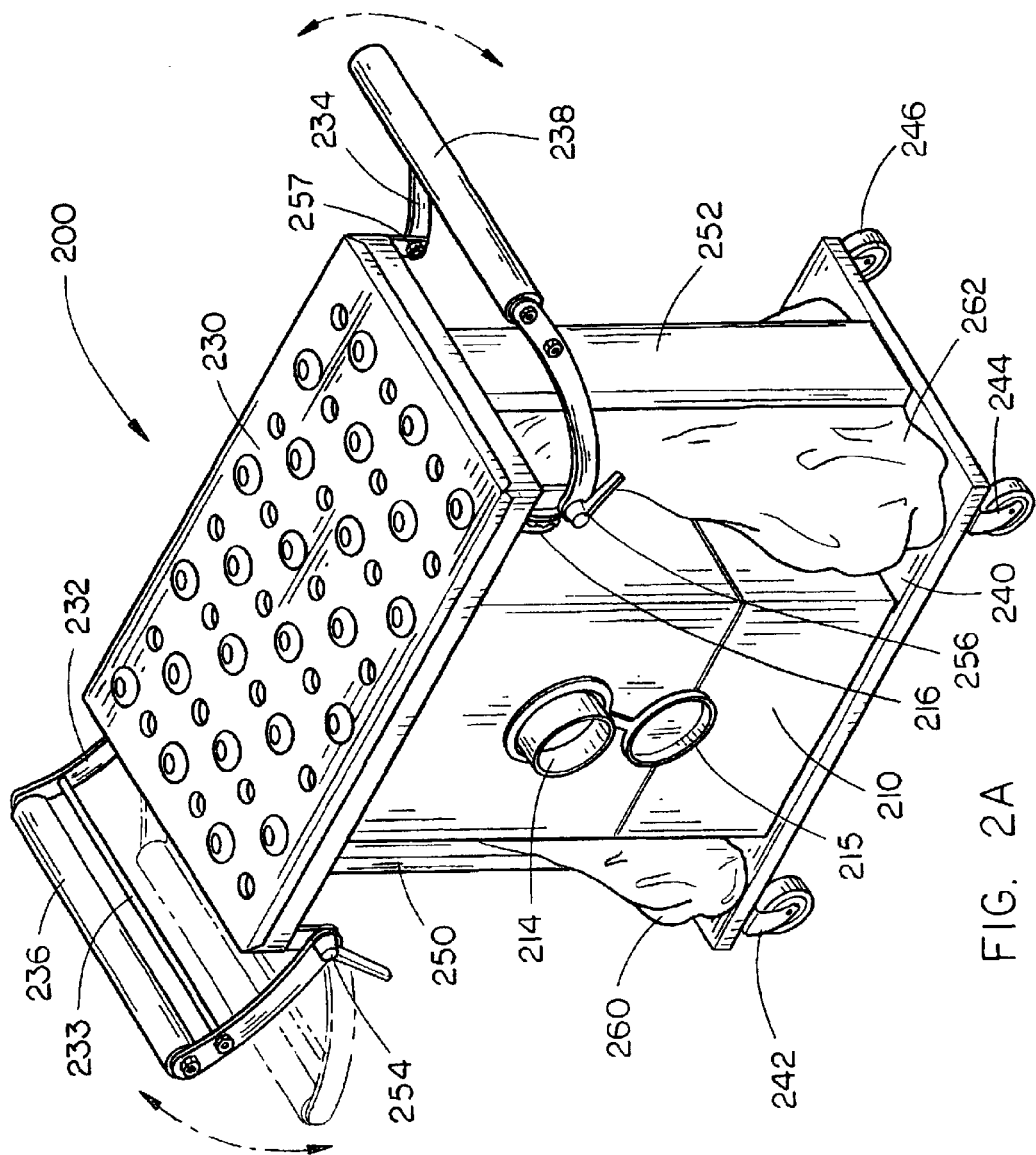
FIG. 2A is an isometric front view illustrating a downdraft dust collector including a downdraft table and a storage cabinet.
Figure 2B:
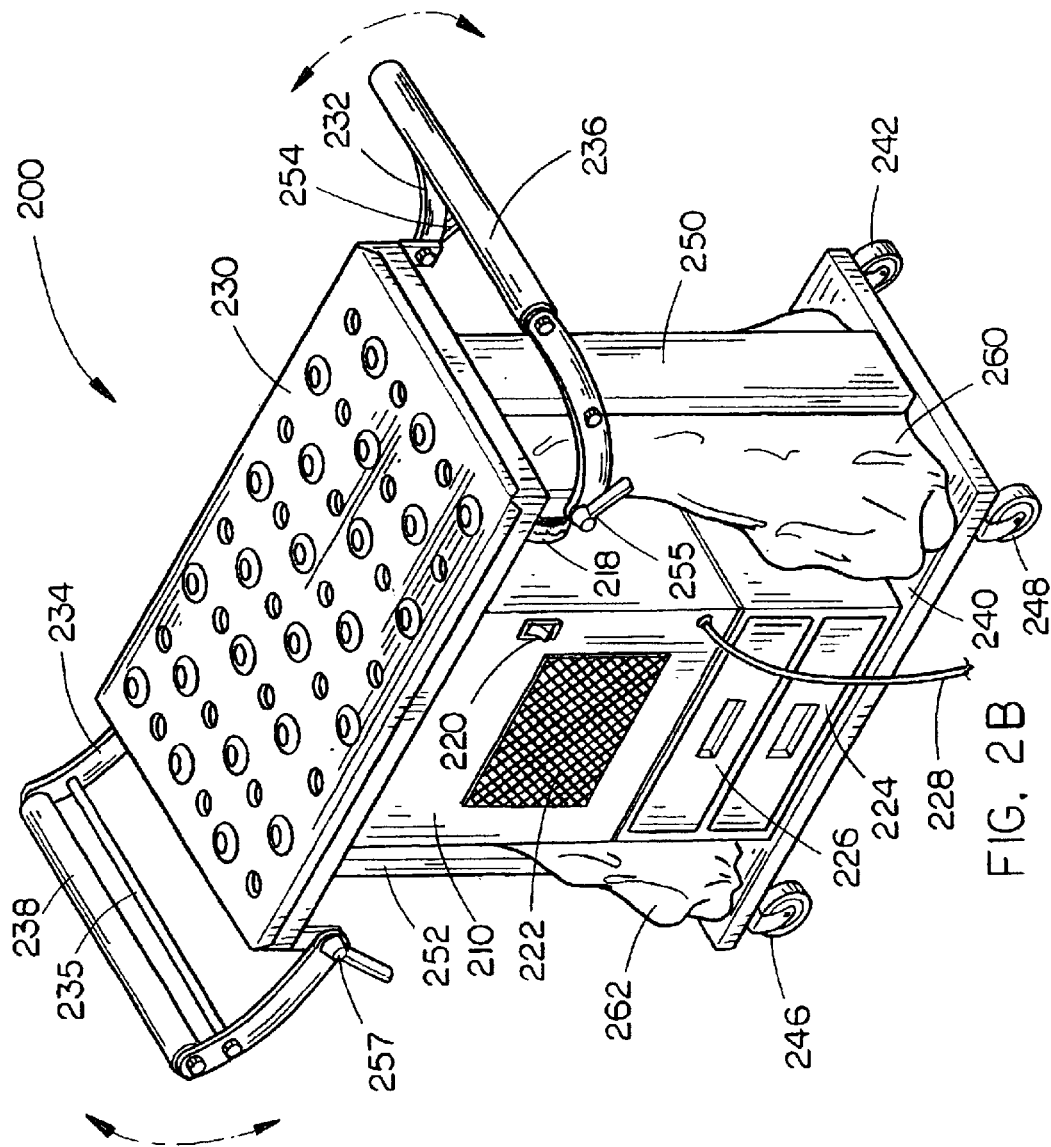
FIG. 2B is an isometric back view illustrating the downdraft dust collector of FIG. 2A.
Figure 3:
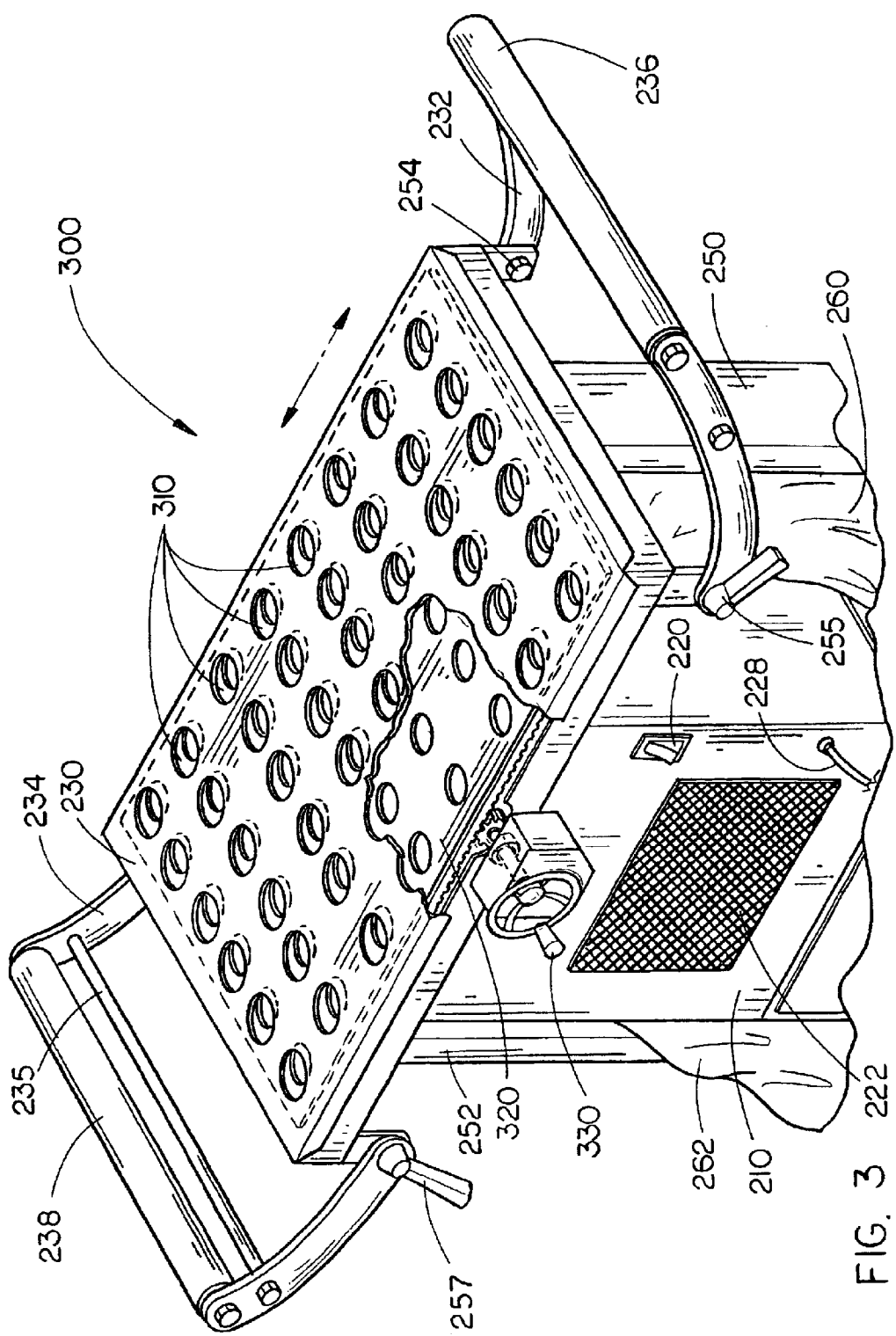
FIG. 3 is a top plan view of the downdraft dust collector of FIGS. 2A and 2B including a plurality of adjustable aperture through points.

Referring generally to FIGS. 2A, 2B and 3, an illustration of a downdraft dust collector 200 is shown. The downdraft dust collector 200 includes a storage cabinet 210, which houses a motor, a dust intake collection port 214, a first outlet gate 216, a second outlet gate 218, an on/off switch 220 and a ventilation port 222. The dust intake collection port 214 includes a cap 215 to cover the intake port when not in use. Additionally, the storage cabinet 210 includes a first drawer 224 and a second drawer 226. A power cord 228 is connected through the storage cabinet 210 to the motor.

Preferably, downdraft table 230 is mounted upon the storage cabinet 210. Connected to the downdraft table 230 is a first multi-position outfeed support mechanism 232 and a second multi-position outfeed support mechanism 234. The downdraft table 230 contains a plurality of through points to allow dust and debris to be collected. The number, size and location of the through points may vary as contemplated by one of ordinary skill in the art.

In alternate embodiments the downdraft table 230, including the first and second multi-position outfeed supports 232 and 234, may be removable from the storage cabinet 210. The removable downdraft table may be connected to a variety of other assemblies such as, a work bench, a cart, a tool cabinet, and the like. Additionally, the removable downdraft table may be attached with a variety of vacuum systems. The removable downdraft table may be connected to support members which enable the removable downdraft table as a stand alone system.

The platform 240 has the storage cabinet 210 disposed upon it. On the side opposite of the storage cabinet 210 the platform 240 is disposed with mobile base members 242, 244, 246 and 248. Preferably, the mobile base members 242 through 248 are locking base casters. Alternately, the platform 240 may be mounted with universal base members or other configurations as contemplated by one of ordinary skill in the art.

A first support member 250 and a second support member 252 are mounted upon platform 240 and connect to the underside of the downdraft table 230. The first and second support members are composed of metal, such as steel, aluminum and the like. The support members may be composed of other rigid materials, such as plastic, wood, fiberglass and the like without departing from the scope and spirit of the present invention.

A first storage facility 260 and a second storage facility 262 are dust bags that connect to the first and second outlet gates 216 and 218, respectively. It is contemplated that the storage facilities may be dust cans or other storage facilities as may be contemplated by one of ordinary skill in the art. The connection of the storage facilities to the outlet gates is secured by the use of fasteners. An operator of the downdraft table 200 may employ a variety of fasteners, such as strap, compression or bolt fasteners to secure the first and second storage facilities 260 and 262 to the first and second outlet gates 216 and 218. The first and second storage facilities 260 and 262 are generally disposed upon the platform at the end opposite the connection to the first and second outlet gates and may be connected to the first and second support members 250 and 252 by the use of fasteners (the fasteners may be of the same description as those described above).

The first multi-position outfeed support mechanism 232 and the second multi-position outfeed support mechanism 234 are connected to opposite ends of the downdraft table 230. The multi-position outfeed supports provide extended support to a work piece received on the downdraft table 230. Preferably, each outfeed support mechanism comprise two arms connected together by a central axle. Other configurations, as contemplated by one of ordinary skill in the art, may he employed to comprise the outfeed support mechanisms without departing from the scope and spirit of the present invention. Rollers 236 and 238 surround each axle, respectively. In the present embodiment the first and second outfeed support mechanisms also include a first lateral support member 233 and a second lateral support member 235. Any number, including zero, of lateral support members may be included without departing from the scope and spirit of the present invention.

Preferably, the connection of each of these outfeed support mechanisms to the downdraft table 230 is accomplished by locking bolt fasteners at each point where the arms of the outfeed supports meet the downdraft table 230. A first locking bolt fastener 254 and a second locking bolt fastener 255 connect the first multi-position outfeed support mechanism 232. A third locking bolt fastener 256 and a fourth locking bolt fastener 257 connect the second multi-position outfeed support mechanism 234. Alternately, the connection of each multi-position outfeed support mechanisms to the downdraft table 230 may be accomplished using a variety of adjustable fastening systems, as may be contemplated by one of ordinary skill in the art. Further, the connection of each multi-position outfeed support mechanism may be accomplished by fasteners, such as screws, bolts, pins, and the like, which do not provide adjustability. Each multi-position outfeed support mechanism is enabled to move up and down relative to the downdraft table 230 and lock in the desired position. It is contemplated that a hydraulic system may be employed within the outfeed support mechanisms 232 and 234 to provide such adjustability.

The outfeed support mechanisms may be attached in a retractable manner to the downdraft table 230. This would allow them to be extended away from the downdraft table 230 when in use and then retracted against the downdraft table 230 when not in use. The outfeed support mechanisms 232 and 234 are composed of metal, but may be composed of other materials, such as very rigid plastic, without departing from the scope and spirit of the present invention.

In the present embodiment the storage cabinet 210 includes two drawers providing additional storage for tools, work clothes and other accessories. This additional storage facility may include one or more shelves or drawers or may he comprised of a combination of drawers and shelves. The storage cabinet 210 may also include a cabinet door covering the front of a plurality of shelves.

Alternately, the storage cabinet 210 may be an independent storage facility, such as a tool cabinet which may be connected to the removable downdraft table 230. The independent storage facility may include a vacuum system or portals for connecting with a vacuum system. In other embodiments the storage cabinet 210 may be a cart, a work bench, and the like, upon which the removable downdraft table 230 may be disposed.

The downdraft table 230 including a plurality of through points 310 located within its surface is shown in FIG. 3. The plurality of through points 310 are circular holes of fixed aperture size and allow dust, debris and other loose materials to be filtered out of the work environment. In the current embodiment the downdraft table 230 employs a baffle 320 that allows an operator to adjust the size of the openings provided by the plurality of through points 310. The baffle 320 position is adjusted by a handle 330 located on the downdraft table 230. It is contemplated that the handle 330 may be located upon the storage cabinet 210 or a location as contemplated by one of ordinary skill in the art.

Alternately, the ability to adjust aperture size may be provided by sleeves, which may be coupled individually to each of the plurality of through points 310 or structural pieces that include an adjustable diameter capability, permanently affixed to each of the plurality of through points 310. Other methods may be employed as may be contemplated by one of ordinary skill in the art. The downdraft table 230 may include the ability to adjust the aperture size of every hole or no holes may have aperture size adjustment capabilities.

Figure 4:
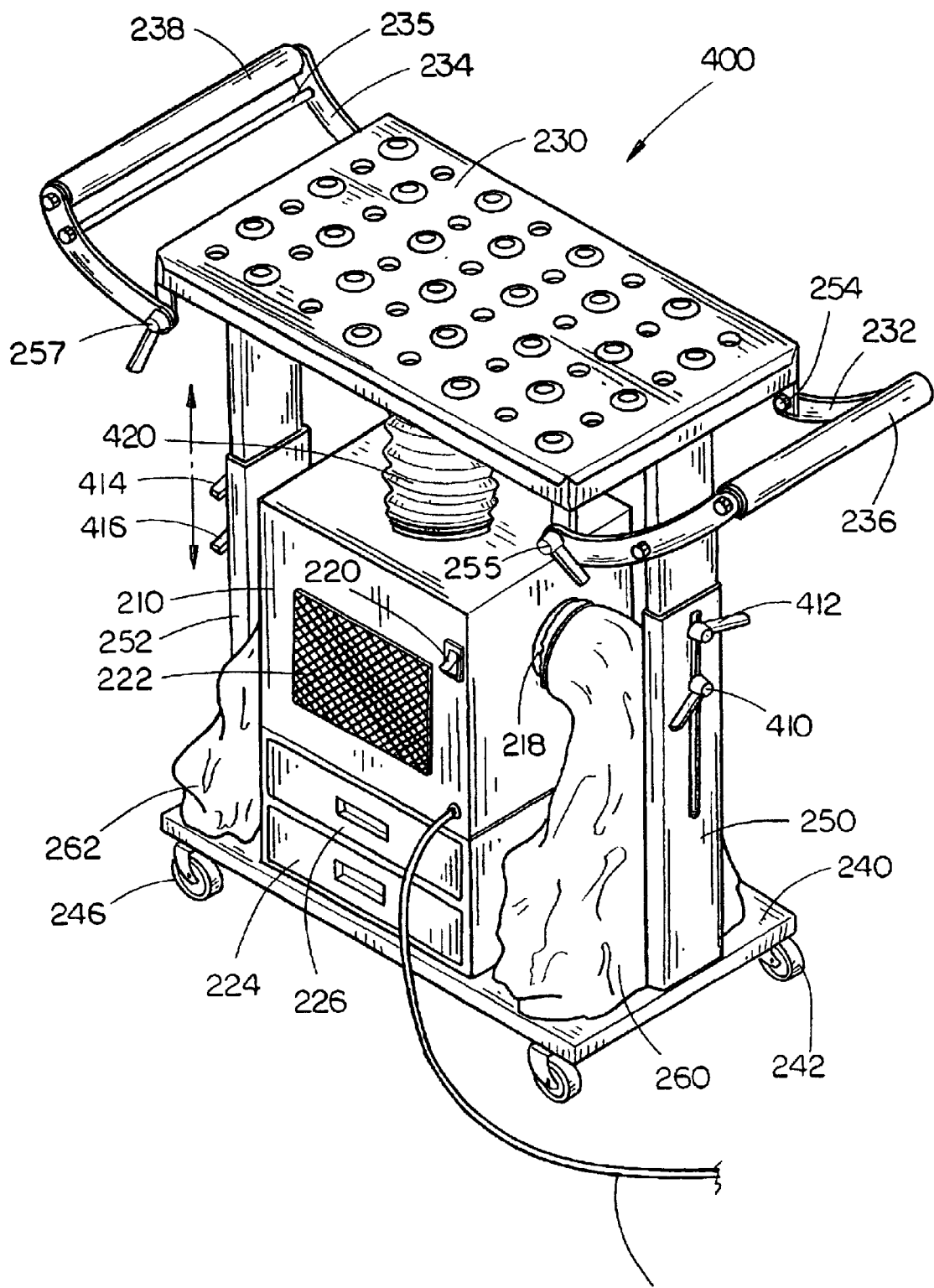
FIG. 4 is an isometric view of the downdraft dust collector of FIGS. 2A and 2B including an adjustable height downdraft table.

FIG. 4 illustrates a downdraft dust collector 400. The downdraft dust collector 400 is similar to the downdraft dust collector 200 in all respects except that downdraft dust collector 400 includes a vertical adjustment system connected to the downdraft table 230. Support members 250 and 252 are each comprised of two parts, an outer sleeve and an inner arm. A fastener system of sliding lockable bolt fasteners is employed to provide vertical adjustment capabilities. A first lockable bolt fastener 410 and a second lockable bolt fastener 412 are disposed on support member 250. A third lockable bolt fastener 414 and a fourth lockable bolt fastener 416 are disposed on support member 252. These lockable bolt fasteners engage the inner arm and outer sleeve of each support member and allow the inner arm to be moved up and down relative to the outer sleeve and then fixed in the desired position. The system of vertical adjustment employed on the downdraft dust collector 400 is similar to that described in FIG. 1 for the downdraft dust collector 100. It is contemplated that the adjustment mechanisms may be solid screw devices, which raise and lower the inner arms located within support members 250 and 252, respectively. The adjustment mechanisms may utilize other systems, such as hydraulic systems and the like to accomplish table movement.

Storage cabinet 210 may include a sleeve 420 that enables it to remain operably engaged with the downdraft table 230 as it moves up and down above the storage cabinet 210. The sleeve 420 is a vacuum hose that connects to the bottom of the downdraft table 230 and the top of the storage cabinet 210. Other methods of connection between the storage cabinet 210 and the vertically adjustable downdraft table 230, as contemplated by one of skill in the art, may be employed.

Figure 5:
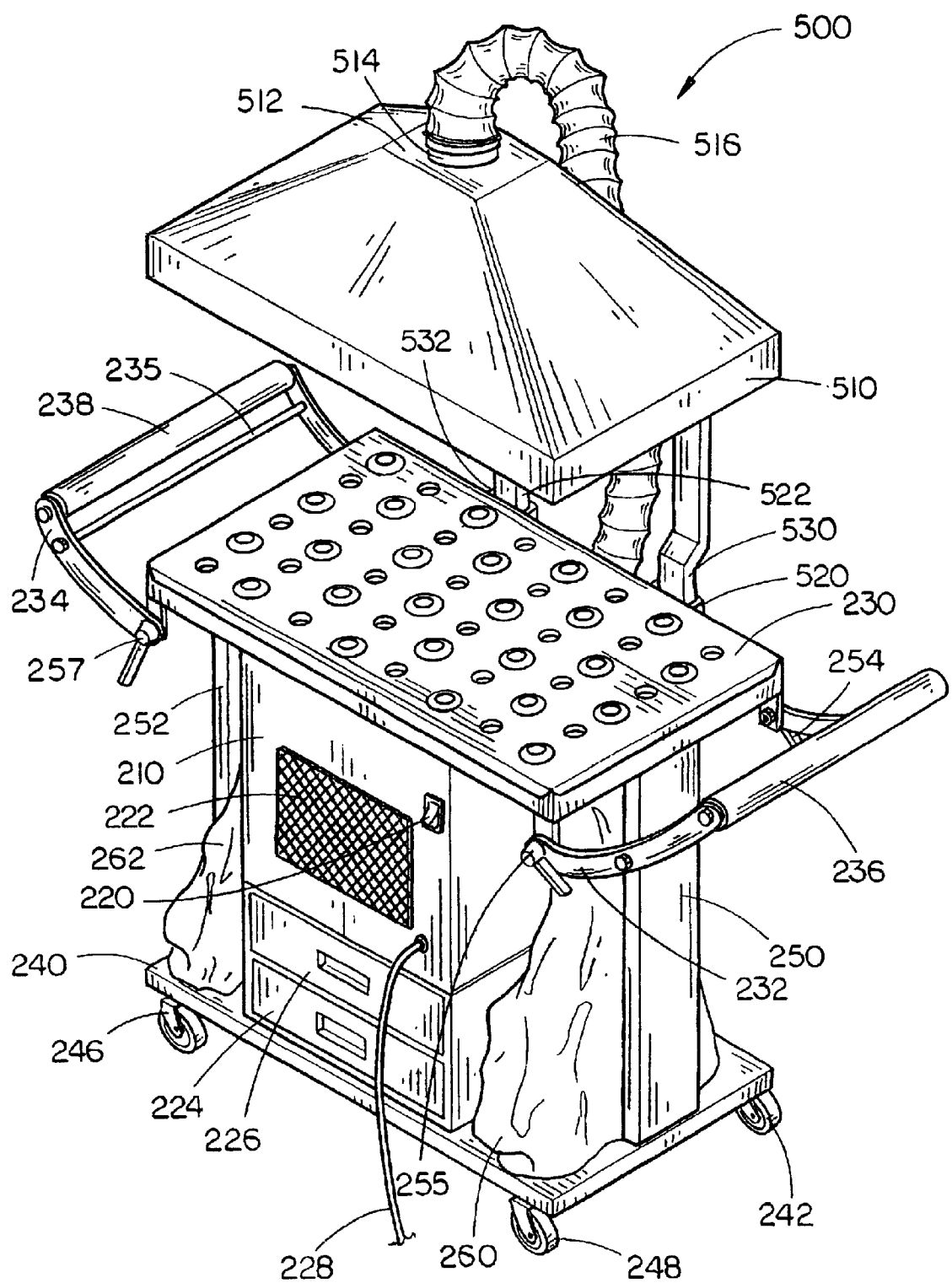
FIG. 5 is an isometric view of the downdraft dust collector of FIGS. 2A and 2B operably engaging a dust hood.

Downdraft dust collector 500 is shown in FIG. 5. The downdraft dust collector 500 is similar to the downdraft dust collector 200 in all respects except that downdraft dust collector 500 includes a dust hood system attached to the downdraft dust collector. The downdraft dust collector 500 operably engages a dust hood 510 over the downdraft table 230. The downdraft table 230 includes mounting devices 520 and 522 which engage dust hood mounting members 530 and 532. The dust hood mounting members 530 and 532 may provide a fixed height to the dust hood 510 or may allow the height of the dust hood to be adjustable. The dust hood 510 includes a top side 512 with a connection port 514 that connects a vacuum hose 516. The vacuum hose 516 connects at the opposite end with an intake port disposed on the storage cabinet as previously described in FIG. 2A. Alternately, the top side 512 may be sealed to force any dust or debris it catches back down towards the downdraft table 230 where it is collected. The dust hood 510 may be permanently attached to a backside of the downdraft dust collector 500 when not in use. Alternatively, the dust hood 510 may be removable from downdraft dust collector 500.

Figure 6:
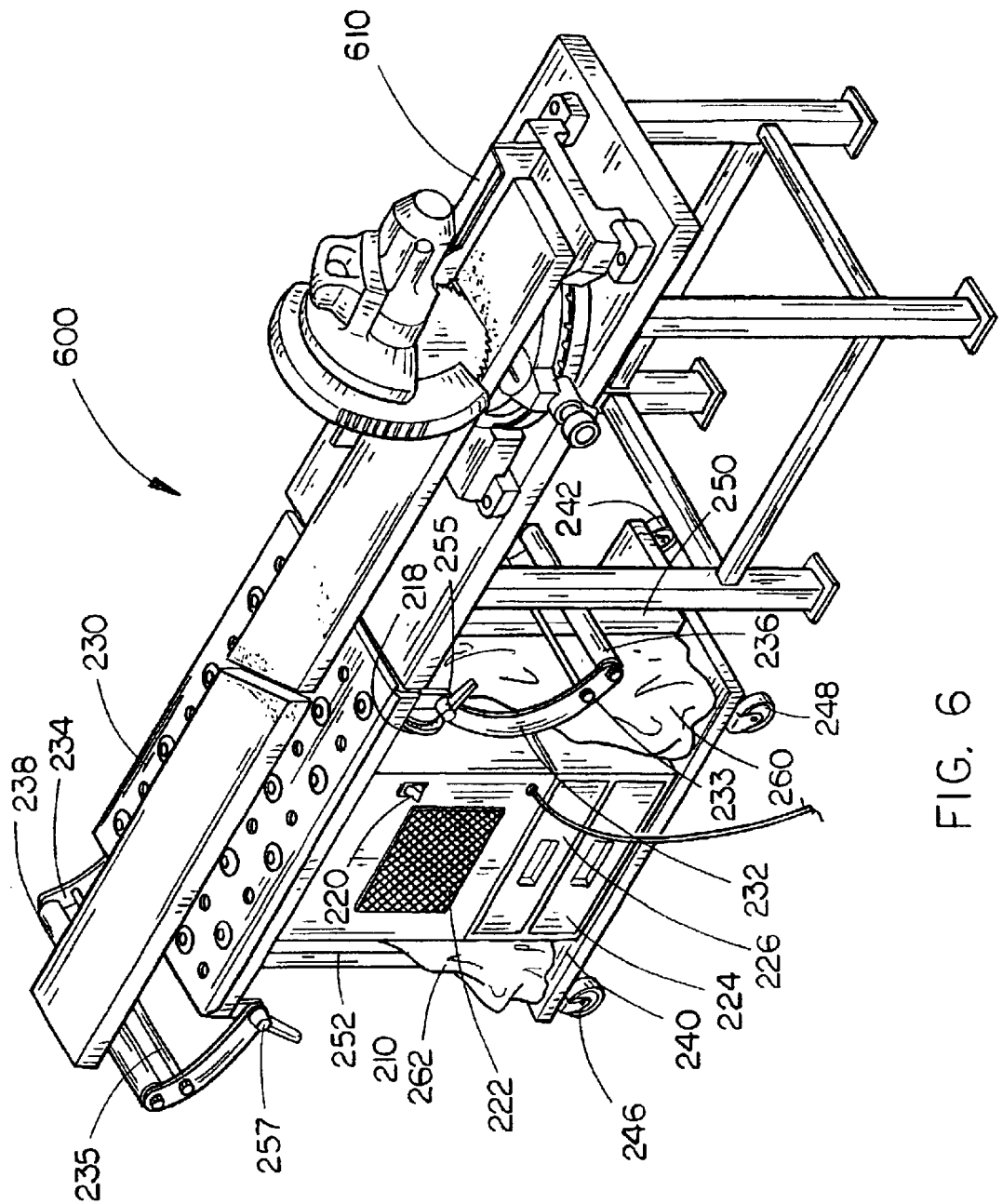
FIG. 6 is an isometric view of a system including the downdraft dust collector of FIGS. 2A and 2B operably engaging a table saw.

FIG. 6 illustrates a system 600 including the downdraft dust collector 200 operably engaged with a table saw system 610. The downdraft dust collector 200 is set alongside the table saw and as the work pieces are finished cutting they are moved over the downdraft table 230 where any loose debris, dust and other material is collected. The downdraft dust collector 200 may be locked in place utilizing wheels which lock or the downdraft dust collector 200 may include latching devices in order to connect the downdraft dust collector 200 with any machine with which the downdraft dust collector 200 is to be operably employed. The latching devices may be hooks, straps, clamps and the like in order to allow the downdraft dust collector 200 to attach with any machine.

It is believed that the downdraft dust collector of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A downdraft dust collector, comprising:
   a work table;
   an outfeed support connected to the work table, the outfeed support being suitable for providing extended support to a work piece received on the work table; and
   a dust collection system connected to the work table, the dust collection system being suitable for providing dust collection to the work table,
   wherein the downdraft dust collector provides an extendable work table and dust collection.

2. The downdraft dust collector of claim 1, wherein the outfeed support comprises a multi-position outfeed support.

3. The downdraft dust collector of claim 1, wherein the work table is removable from the dust collection system.

4. The downdraft dust collector of claim 1, wherein the work table comprises a downdraft table connected to the dust collection system, the downdraft table comprises a plurality of fixed aperture size through points enabling dust collection.

5. The downdraft dust collector of claim 4, wherein the downdraft table includes at least one of a baffle and a shield to allow an operator to adjust the aperture size of the plurality of through points.

6. The downdraft dust collector of claim 5, wherein the downdraft table comprises a non-slip surface.

7. The downdraft dust collector of claim 6, wherein the downdraft table is removable from the dust collection system.

8. The downdraft dust collector of claim 1, wherein the downdraft dust collector further comprises:
   a platform suitable for providing a base for the downdraft dust collector; and
   a support member connected to the platform and the work table, the support member being suitable for providing structural support to the work table of the downdraft dust collector.

9. The downdraft dust collector of claim 8, wherein the support member comprises a vertically adjustable support member connected to the platform and the work table, the vertically adjustable support member enabling vertical adjustment of the work table.

10. The downdraft dust collector of claim 8, wherein the platform comprises at least one of at least one base caster, wheel, and roller.

11. The downdraft dust collector of claim 1, wherein the dust collection system further comprises:
    a housing;
    a motor disposed upon the housing, the motor being suitable for providing vacuuming power;
    an intake dust collection port connected to the motor and disposed upon the housing, the intake dust collection port being suitable for providing the intake of dust;
    an outlet gate connected to the motor and disposed upon the housing, the outlet gate being suitable for discharging the collected dust;
    a dust storage facility connected to the outlet gate, the dust storage facility being suitable for storing the dust collected and discharged;
    an on/off switch disposed upon the housing; and
    a power cord connected to the motor and disposed upon the housing, the power cord being suitable for providing power to the motor.

12. The downdraft dust collector of claim 11, wherein the intake dust collection port includes a cap to cover the intake dust collection port when not in use.

13. The downdraft dust collector of claim 12, wherein the intake dust collection port includes a dual port adapter.

14. The downdraft dust collector of claim 11, wherein the housing is connected to the work table.

15. The downdraft dust collector of claim 14, wherein the work table is removable from the housing.

16. The downdraft dust collector of claim 14, wherein the housing further includes at least one of a shelf and a drawer.

17. The downdraft dust collector of claim 11, wherein the dust storage facility comprises at least one of a dust bag and a dust can connected to the outlet gate.

18. The downdraft dust collector of claim 11, wherein the dust storage facility further comprises a fastener.

19. The downdraft dust collector of claim 1, wherein the downdraft dust collector includes a dust hood.

20. A downdraft dust collector, comprising:
    a downdraft table including a plurality of fixed aperture size through points, the downdraft table being suitable for providing a work table;
    a multi-position outfeed support connected to the downdraft table, the multi-position outfeed support being suitable for providing extended support to a work piece received on the downdraft table; and
    a dust collection system connected to the downdraft table, the dust collection system being suitable for providing dust collection to the downdraft table,
    wherein the downdraft dust collector provides an extendable downdraft table and dust collection.

21. The downdraft dust collector of claim 20, wherein the downdraft table includes at least one of a baffle and a shield to allow an operator to adjust the aperture size of the plurality of through points.

22. The downdraft dust collector of claim 21, wherein the downdraft table comprises a non-slip surface.

23. The downdraft dust collector of claim 22, wherein the downdraft table is removable from the dust collection system.

24. The downdraft dust collector of claim 20, wherein the downdraft dust collector further comprises:
    a platform suitable for providing a base for the downdraft dust collector; and
    a support member connected to the platform and the work table, the support member being suitable for providing structural support to the work table of the downdraft dust collector.

25. The downdraft dust collector of claim 24, wherein the support member comprises a vertically adjustable support member connected to the platform and the work table, the vertically adjustable support member enabling vertical adjustment of the work table.

26. The downdraft dust collector of claim 24, wherein the platform comprises at least one of at least one base caster, wheel, and roller.

27. The downdraft dust collector of claim 20, wherein the dust collection system further comprises:
    a housing;
    a motor disposed upon the housing, the motor being suitable for providing vacuuming power;
    an intake dust collection port connected to the motor and disposed upon the housing, the intake dust collection port being suitable for providing the intake of dust;
    an outlet gate connected to the motor and disposed upon the housing, the outlet gate being suitable for discharging the collected dust;
    a dust storage facility connected to the outlet gate, the dust storage facility being suitable for storing the dust collected and discharged;
    an on/off switch disposed upon the housing; and
    a power cord connected to the motor and disposed upon the housing, the power cord being suitable for providing power to the motor.

28. The downdraft dust collector of claim 27, wherein the intake dust collection port includes a cap to cover the intake dust collection port when not in use.

29. The downdraft dust collector of claim 28, wherein the intake dust collection port includes a dual port adapter.

30. The downdraft dust collector of claim 27, wherein the housing is connected to the downdraft table.

31. The downdraft dust collector of claim 30, wherein the downdraft table is removable from the housing.

32. The downdraft dust collector of claim 30, wherein the housing further includes at least one of a shelf and a drawer.

33. The downdraft dust collector of claim 27, wherein the dust storage facility comprises at least one of a dust bag and a dust can connected to the outlet gate.

34. The downdraft dust collector of claim 33, wherein the dust storage facility further comprises a fastener.

35. The downdraft dust collector of claim 20, wherein the downdraft dust collector includes a dust hood.

36. A downdraft dust collector, comprising:

a downdraft table including a plurality of fixed aperture size through points and at least one of a baffle and a shield for adjusting the aperture size of the plurality of through points, the downdraft table being suitable for providing a work table;

a multi-position outfeed support connected to the downdraft table, the multi-position outfeed support being suitable for providing extended support to a work piece received on the downdraft table;

a cabinet connected to the downdraft table, the cabinet being suitable for providing storage; and a dust collection system connected to the downdraft table, the dust collection system being suitable for providing dust collection to the downdraft table; and wherein the downdraft dust collector provides an extendable downdraft table, dust collection and storage.

37. The downdraft dust collector of claim 36, wherein the downdraft table includes a non-slip surface.

38. The downdraft dust collector of claim 37, wherein the downdraft table is removable from the dust collection system.

39. The downdraft dust collector of claim 36, wherein the downdraft dust collector further comprises:

a platform suitable for providing a base for the downdraft dust collector; and a support member connected to the platform and the work table, the support member being suitable for providing structural support to the work table of the downdraft dust collector.

40. The downdraft dust collector of claim 39, wherein the support member comprises a vertically adjustable support member connected to the platform and the work table, the vertically adjustable support member enabling vertical adjustment of the work table.

41. The downdraft dust collector of claim 39, wherein the platform comprises at least one of at least one base caster, wheel, and roller.

42. The downdraft dust collector of claim 36, wherein the dust collection system disposed upon the cabinet, further comprises:

a motor suitable for providing vacuuming power;

an intake dust collection port connected to the motor and disposed upon the cabinet, the intake dust collection port being suitable for providing the intake of dust;

an outlet gate connected to the motor and disposed upon the cabinet, the outlet gate being suitable for discharging the collected dust;

a dust storage facility connected to the outlet gate, the dust storage facility being suitable for storing the dust collected and discharged;

an on/off switch disposed upon the cabinet; and a power cord connected to the motor and disposed upon the cabinet, the power cord being suitable for providing power to the motor.

43. The downdraft dust collector of claim 42, wherein the intake dust collection port includes a cap to cover the intake dust collection port when not in use.

44. The downdraft dust collector of claim 43, wherein the intake dust collection port includes a dual port adapter.

45. The downdraft dust collector of claim 42, wherein the cabinet is connected to the downdraft table.

46. The downdraft dust collector of claim 45, wherein the downdraft table is removable from the cabinet.

47. The downdraft dust collector of claim 45, wherein the cabinet further includes at least one of a shelf and a drawer.

48. The downdraft dust collector of claim 42, wherein the dust storage facility comprises at least one of a dust bag and a dust can connected to the outlet gate.

49. The downdraft dust collector of claim 48, wherein the dust storage facility further comprises a fastener.

50. The downdraft dust collector of claim 36, wherein the downdraft dust collector includes a dust hood.

* * * * *